(12) United States Patent
Rosenwald

(10) Patent No.: US 12,544,596 B2
(45) Date of Patent: Feb. 10, 2026

(54) ADJUSTABLE RADIATION DETECTOR SUPPORT

(71) Applicant: Sun Nuclear Corporation, Melbourne, FL (US)

(72) Inventor: Charles Rosenwald, Melbourne, FL (US)

(73) Assignee: Sun Nuclear Corporation, Melbourne, FL (US)

( * ) Notice: Subject to any disclaimer, the term of this patent is extended or adjusted under 35 U.S.C. 154(b) by 162 days.

(21) Appl. No.: 18/583,695

(22) Filed: Feb. 21, 2024

(65) Prior Publication Data

US 2024/0325791 A1    Oct. 3, 2024

Related U.S. Application Data

(60) Provisional application No. 63/493,263, filed on Mar. 30, 2023.

(51) Int. Cl.
*A61N 5/10* (2006.01)

(52) U.S. Cl.
CPC .................. *A61N 5/1075* (2013.01)

(58) Field of Classification Search
CPC ............ A61N 5/1075; A61N 2005/1076
See application file for complete search history.

(56) References Cited

U.S. PATENT DOCUMENTS

| | | | |
|---|---|---|---|
| 759,608 A | 5/1904 | Harper | |
| 1,239,145 A | 9/1917 | Wantz | |
| 2,818,510 A | 12/1957 | Verse | |
| 3,033,985 A | 5/1962 | Petree | |
| 3,267,728 A | 8/1966 | Solomons | |
| 3,327,213 A | 6/1967 | Wald, Jr. | |
| 3,394,258 A | 7/1968 | Schleiger | |
| 3,433,953 A | 3/1969 | Sweet | |
| 3,665,762 A | 5/1972 | Domen | |
| 3,783,251 A | 1/1974 | Pavkovich | |
| 3,790,794 A | 2/1974 | Murray | |
| 3,978,336 A | 8/1976 | Roux | |

(Continued)

FOREIGN PATENT DOCUMENTS

| | | |
|---|---|---|
| CA | 2718408 | 9/2009 |
| DE | 102009039345 A1 | 3/2011 |

(Continued)

OTHER PUBLICATIONS

Mackie et al., "A convolution method of calculating dose for 15-MVx rays", Med. Phys. 12, 188-196, 1985.

(Continued)

*Primary Examiner* — David P Porta
*Assistant Examiner* — Mamadou Faye
(74) *Attorney, Agent, or Firm* — Pillsbury Winthrop Shaw Pittman LLP

(57) ABSTRACT

Disclosed is a system for performing radiation therapy quality assurance. The system includes a tank, a drive system configured to move a radiation detector in three dimensions within the tank and an adjustable radiation detector support configured to be coupled to the drive system. The adjustable radiation detector support has an aperture for receiving a radiation detector and is configured to translate the radiation detector in an axial direction relative to the adjustable radiation detector support.

25 Claims, 11 Drawing Sheets

(56) References Cited

U.S. PATENT DOCUMENTS

| | | | |
|---|---|---|---|
| 3,980,885 | A | 9/1976 | Steward |
| 4,058,832 | A | 11/1977 | Vagi |
| 4,063,097 | A | 12/1977 | Barrett |
| 4,107,531 | A | 8/1978 | Garratt |
| 4,157,472 | A | 6/1979 | Barrett |
| 4,312,224 | A | 1/1982 | Domen |
| 4,450,440 | A | 5/1984 | White |
| 4,455,609 | A | 6/1984 | Inamura |
| 4,613,754 | A | 9/1986 | Vinegar |
| 4,729,099 | A | 3/1988 | Iverson |
| 4,765,749 | A | 8/1988 | Bourgade |
| 4,777,442 | A | 10/1988 | Rosenthal |
| 4,871,914 | A | 10/1989 | Simon |
| 4,887,287 | A | 12/1989 | Cobben |
| 5,059,801 | A | 10/1991 | Burgess |
| 5,099,505 | A | 3/1992 | Seppi |
| 5,160,337 | A | 11/1992 | Cosman |
| 5,262,649 | A | 11/1993 | Antonuk |
| 5,388,142 | A | 2/1995 | Morris |
| 5,394,452 | A | 2/1995 | Swerdloff |
| 5,596,653 | A | 1/1997 | Kurokawa |
| 5,602,892 | A | 2/1997 | Llacer |
| 5,621,214 | A | 4/1997 | Sofield |
| 5,622,187 | A | 4/1997 | Carol |
| 5,627,367 | A | 5/1997 | Sofield |
| 5,635,709 | A | 6/1997 | Sliski |
| 5,640,436 | A | 6/1997 | Kawai |
| 5,652,430 | A | 7/1997 | Lee |
| 5,661,310 | A | 8/1997 | Jones |
| 5,704,890 | A | 1/1998 | Bliss |
| 5,712,482 | A | 1/1998 | Gaiser |
| 5,873,826 | A | 2/1999 | Gono |
| 5,988,875 | A | 11/1999 | Gershfeld |
| 6,038,283 | A | 3/2000 | Carol |
| 6,125,335 | A | 9/2000 | Simon |
| 6,131,690 | A | 10/2000 | Galando |
| 6,148,272 | A | 11/2000 | Bergstrom |
| 6,175,761 | B1 | 1/2001 | Frandsen |
| 6,207,952 | B1 | 3/2001 | Kan |
| 6,257,552 | B1 | 7/2001 | Crow |
| 6,261,219 | B1 | 7/2001 | Meloul |
| 6,301,329 | B1 | 10/2001 | Surridge |
| 6,322,249 | B1 | 11/2001 | Wofford |
| 6,345,114 | B1 | 2/2002 | Mackie |
| 6,364,529 | B1 | 4/2002 | Dawson |
| 6,398,710 | B1 | 6/2002 | Ishikawa |
| 6,466,644 | B1 | 10/2002 | Hughes |
| 6,516,046 | B1 | 2/2003 | Froehlich |
| 6,535,574 | B1 | 3/2003 | Collins |
| 6,535,756 | B1 | 3/2003 | Simon |
| 6,552,347 | B1 | 4/2003 | Dimcovski |
| 6,560,311 | B1 | 5/2003 | Shepard |
| 6,594,336 | B2 | 7/2003 | Nishizawa |
| 6,609,626 | B2 | 8/2003 | Young |
| 6,609,826 | B1 | 8/2003 | Fujii |
| 6,626,569 | B2 | 9/2003 | Reinstein |
| 6,636,622 | B2 | 10/2003 | Mackie |
| 6,648,503 | B2 | 11/2003 | Tanaka |
| 6,712,508 | B2 | 3/2004 | Nilsson |
| 6,788,759 | B2 | 9/2004 | Op De Beek |
| 6,799,068 | B1 | 9/2004 | Hartmann |
| 6,810,107 | B2 | 10/2004 | Steinberg |
| 6,810,108 | B2 | 10/2004 | Clark |
| 6,833,707 | B1 | 12/2004 | Dahn |
| 6,839,404 | B2 | 1/2005 | Clark |
| 6,853,702 | B2 | 2/2005 | Renner |
| 6,888,919 | B2 | 5/2005 | Graf |
| 6,904,119 | B2 | 6/2005 | Oikawa |
| 6,904,125 | B2 | 6/2005 | Van Dyk |
| 6,904,162 | B2 | 6/2005 | Robar |
| 6,974,254 | B2 | 12/2005 | Paliwal |
| 6,990,368 | B2 | 1/2006 | Simon |
| 6,992,309 | B1 | 1/2006 | Petry |
| 7,016,454 | B2 | 3/2006 | Warnberg |
| 7,065,812 | B2 | 6/2006 | Newkirk |
| 7,076,023 | B2 | 7/2006 | Ghelmansarai |
| 7,098,463 | B2 | 8/2006 | Adamovics |
| 7,116,749 | B2 | 10/2006 | Besson |
| 7,125,163 | B2 | 10/2006 | Eigler |
| 7,127,028 | B2 | 10/2006 | Sendai |
| 7,127,030 | B2 | 10/2006 | Tamegai |
| 7,142,634 | B2 | 11/2006 | Engler |
| 7,193,220 | B1 | 3/2007 | Navarro |
| 7,221,733 | B1 | 5/2007 | Takai |
| 7,233,688 | B2 | 6/2007 | Ritt |
| 7,234,355 | B2 | 6/2007 | Dewangan |
| 7,298,820 | B2 | 11/2007 | Nelson |
| 7,339,159 | B2 | 3/2008 | Juh |
| 7,349,523 | B2 | 3/2008 | Jenkins |
| 7,352,840 | B1 | 4/2008 | Nagarkar |
| 7,371,007 | B2 | 5/2008 | Nilsson |
| 7,386,089 | B2 | 6/2008 | Endo |
| 7,420,160 | B2 | 9/2008 | Delaperriere |
| 7,453,976 | B1 | 11/2008 | Yin |
| 7,455,449 | B2 | 11/2008 | Nishimura |
| 7,471,765 | B2 | 12/2008 | Jaffray |
| 7,515,681 | B2 | 4/2009 | Ebstein |
| 7,579,608 | B2 | 8/2009 | Takahashi |
| 7,605,365 | B2 | 10/2009 | Chen |
| 7,636,419 | B1 | 12/2009 | Nelson |
| 7,668,292 | B1 | 2/2010 | Bose |
| 7,734,010 | B2 | 6/2010 | Otto |
| 7,750,311 | B2 | 7/2010 | Daghighian |
| 7,766,903 | B2 | 8/2010 | Blumenkranz |
| 7,773,723 | B2 | 8/2010 | Nord |
| 7,778,383 | B2 | 8/2010 | Koehler |
| 7,778,392 | B1 | 8/2010 | Berman |
| 7,778,680 | B2 | 8/2010 | Goode, Jr. |
| 7,782,998 | B2 | 8/2010 | Langan |
| 7,945,022 | B2 | 5/2011 | Nelms |
| 8,044,359 | B2 | 10/2011 | Simon |
| 8,093,549 | B2 | 1/2012 | Navarro |
| 8,130,905 | B1 | 3/2012 | Nelms |
| 8,136,773 | B2 | 3/2012 | Schmutzer |
| 8,147,139 | B2 | 4/2012 | Papaioannou |
| 8,218,718 | B1 | 7/2012 | Van Herk |
| 8,235,530 | B2 | 8/2012 | Maad |
| 8,242,458 | B2 | 8/2012 | Rinecker |
| 8,321,179 | B2 | 11/2012 | Simon |
| 8,325,878 | B2 | 12/2012 | Mcnutt |
| 8,430,564 | B2 | 4/2013 | Simmons |
| 8,457,713 | B2 | 6/2013 | Kagermeier |
| 8,474,794 | B2 | 7/2013 | Liljedahl |
| 8,536,547 | B2 | 9/2013 | Maurer |
| 8,541,756 | B1 | 9/2013 | Treas |
| 8,605,857 | B1 | 12/2013 | Renner |
| 8,632,448 | B1 | 1/2014 | Schulte |
| 8,726,814 | B1 | 5/2014 | Matteo |
| 8,794,899 | B2 | 8/2014 | Cozza |
| 8,833,709 | B2 | 9/2014 | Weng |
| 8,840,304 | B2 | 9/2014 | Perez Zarate |
| 8,840,340 | B2 | 9/2014 | Eisenhower |
| 8,874,385 | B2 | 10/2014 | Takayanagi |
| 8,927,921 | B1 | 1/2015 | Nelms |
| 9,050,460 | B2 | 6/2015 | Hildreth |
| 9,097,384 | B1 | 8/2015 | Simon |
| 9,310,263 | B2 | 4/2016 | Thoen |
| 9,463,336 | B2 | 10/2016 | Nelms |
| 9,480,861 | B2 | 11/2016 | Kapatoes |
| 9,561,388 | B2 | 2/2017 | Hildreth |
| 9,586,060 | B2 | 3/2017 | Seuntjens |
| 9,750,955 | B2 | 9/2017 | Mcnutt |
| 9,895,557 | B2 | 2/2018 | Seuntjens |
| 10,099,067 | B2 | 10/2018 | Kapatoes |
| 10,413,754 | B2 | 9/2019 | Seuntjens |
| 10,755,823 | B2 | 8/2020 | Carette |
| 2001/0042841 | A1 | 11/2001 | Lyons |
| 2002/0077545 | A1 | 6/2002 | Takahashi |
| 2002/0080912 | A1 | 6/2002 | Mackie |
| 2003/0043879 | A1 | 3/2003 | Tanaka |
| 2003/0043960 | A1 | 3/2003 | Op De Beek |
| 2003/0138077 | A1 | 7/2003 | Lee |
| 2003/0231740 | A1 | 12/2003 | Paliwal |
| 2004/0066880 | A1 | 4/2004 | Oikawa |

(56) References Cited

U.S. PATENT DOCUMENTS

| | | |
|---|---|---|
| 2004/0068182 A1 | 4/2004 | Misra |
| 2004/0096033 A1 | 5/2004 | Seppi |
| 2004/0113094 A1 | 6/2004 | Lyons |
| 2004/0120560 A1 | 6/2004 | Robar |
| 2004/0129888 A1 | 7/2004 | Kannan |
| 2004/0158145 A1 | 8/2004 | Ghelmansarai |
| 2004/0211917 A1 | 10/2004 | Adamovics |
| 2004/0228435 A1 | 11/2004 | Russell |
| 2004/0251419 A1 | 12/2004 | Nelson |
| 2005/0013406 A1 | 1/2005 | Dyk |
| 2005/0077459 A1 | 4/2005 | Engler |
| 2005/0111621 A1 | 5/2005 | Riker |
| 2005/0281389 A1 | 12/2005 | Kusch |
| 2006/0002519 A1 | 1/2006 | Jenkins |
| 2006/0033044 A1 | 2/2006 | Gentry |
| 2006/0184124 A1 | 8/2006 | Cowan |
| 2006/0203964 A1 | 9/2006 | Nyholm |
| 2006/0203967 A1 | 9/2006 | Nilsson |
| 2006/0266951 A1 | 11/2006 | Fritsch |
| 2007/0041497 A1 | 2/2007 | Schnarr |
| 2007/0041499 A1 | 2/2007 | Lu |
| 2007/0053492 A1 | 3/2007 | Kidani |
| 2007/0071169 A1 | 3/2007 | Yeo |
| 2007/0081629 A1 | 4/2007 | Yin |
| 2007/0086577 A1 | 4/2007 | Kobayashi |
| 2007/0172020 A1 | 7/2007 | Nambu |
| 2007/0181815 A1 | 8/2007 | Ebstein |
| 2007/0195930 A1 | 8/2007 | Kapatoes |
| 2008/0031406 A1 | 2/2008 | Yan |
| 2008/0049896 A1 | 2/2008 | Kuduvalli |
| 2008/0049898 A1 | 2/2008 | Romesberg, III |
| 2008/0091388 A1 | 4/2008 | Failla |
| 2008/0103834 A1 | 5/2008 | Reiner |
| 2008/0118137 A1 | 5/2008 | Chen |
| 2008/0260368 A1 | 10/2008 | Chang |
| 2008/0292055 A1 | 11/2008 | Boone |
| 2008/0298553 A1 | 12/2008 | Takahashi |
| 2009/0003512 A1 | 1/2009 | Pouliot |
| 2009/0003528 A1 | 1/2009 | Ramraj |
| 2009/0067576 A1 | 3/2009 | Maltz |
| 2009/0090870 A1 | 4/2009 | Ahnesjo |
| 2009/0175418 A1 | 7/2009 | Sakurai |
| 2009/0217999 A1 | 9/2009 | Becker |
| 2009/0227841 A1 | 9/2009 | Miyako |
| 2009/0250618 A1 | 10/2009 | Simon |
| 2009/0252292 A1 | 10/2009 | Simon |
| 2009/0326365 A1 | 12/2009 | Goldenberg |
| 2010/0008467 A1 | 1/2010 | Dussault |
| 2011/0022360 A1* | 1/2011 | Simon .............. A61N 5/1048 250/336.1 |
| 2011/0051893 A1 | 3/2011 | Mcnutt |
| 2011/0085716 A1 | 4/2011 | Chefd Hotel |
| 2011/0096906 A1 | 4/2011 | Langeveld |
| 2011/0108702 A1 | 5/2011 | Jackson |
| 2011/0158386 A1 | 6/2011 | Payne |
| 2011/0204262 A1 | 8/2011 | Pu |
| 2011/0210258 A1 | 9/2011 | Black |
| 2011/0248188 A1 | 10/2011 | Brusasco |
| 2011/0278444 A1 | 11/2011 | Navarro |
| 2011/0306864 A1 | 12/2011 | Zarate |
| 2012/0014618 A1 | 1/2012 | Sun |
| 2012/0025105 A1 | 2/2012 | Brown |
| 2012/0025826 A1 | 2/2012 | Zhou |
| 2012/0097860 A1 | 4/2012 | Oguma |
| 2012/0230462 A1 | 9/2012 | Robar |
| 2012/0292517 A1 | 11/2012 | Izaguirre |
| 2012/0305793 A1 | 12/2012 | Schiefer |
| 2012/0326057 A1 | 12/2012 | Remeijer |
| 2013/0048869 A1 | 2/2013 | Kominami |
| 2013/0048883 A1 | 2/2013 | Simon |
| 2013/0258105 A1 | 10/2013 | Jozsef |
| 2013/0287170 A1 | 10/2013 | Ebstein |
| 2013/0303902 A1 | 11/2013 | Smith |
| 2014/0016754 A1 | 1/2014 | Sugiyama |
| 2014/0064445 A1 | 3/2014 | Adler |
| 2014/0073834 A1 | 3/2014 | Hildreth |
| 2014/0077098 A1 | 3/2014 | Tachikawa |
| 2014/0094642 A1 | 4/2014 | Fuji |
| 2014/0105355 A1 | 4/2014 | Toimela |
| 2014/0221816 A1 | 8/2014 | Franke |
| 2014/0237213 A1 | 8/2014 | Gill |
| 2014/0250480 A1 | 9/2014 | Koh |
| 2014/0263990 A1 | 9/2014 | Kawrykow |
| 2015/0071408 A1 | 3/2015 | Ebstein |
| 2015/0080634 A1 | 3/2015 | Huber |
| 2015/0087879 A1 | 3/2015 | Nelms |
| 2015/0108356 A1 | 4/2015 | Seuntjens |
| 2015/0124930 A1 | 5/2015 | Verhaegen |
| 2015/0238778 A1 | 8/2015 | Hildreth |
| 2015/0283403 A1 | 10/2015 | Kapatoes |
| 2015/0309193 A1 | 10/2015 | Kozelka |
| 2015/0327825 A1 | 11/2015 | Suzuki |
| 2015/0352376 A1 | 12/2015 | Wiggers |
| 2016/0067479 A1 | 3/2016 | Marcovecchio |
| 2016/0136460 A1 | 5/2016 | Baltes |
| 2016/0166857 A1 | 6/2016 | Nelms |
| 2016/0256712 A1 | 9/2016 | Vahala |
| 2016/0287906 A1 | 10/2016 | Nord |
| 2016/0310762 A1 | 10/2016 | Ramezanzadeh Moghadam |
| 2016/0361568 A1 | 12/2016 | Chappelow |
| 2017/0021194 A1 | 1/2017 | Nelms |
| 2017/0135580 A1 | 5/2017 | Lips |
| 2017/0173367 A1 | 6/2017 | Seuntjens |
| 2017/0177812 A1 | 6/2017 | Sjölund |
| 2017/0225015 A1 | 8/2017 | Thieme |
| 2017/0274225 A1 | 9/2017 | Baecklund |
| 2018/0014798 A1 | 1/2018 | Beckman |
| 2018/0028143 A1 | 2/2018 | Wiggers |
| 2018/0028840 A1 | 2/2018 | Simon |
| 2018/0043183 A1 | 2/2018 | Sheng |
| 2018/0140272 A1 | 5/2018 | Ruchala |
| 2018/0185672 A1 | 7/2018 | Ramezanzadeh Moghadam |
| 2018/0243586 A1 | 8/2018 | Ramezanzadeh Moghadam |
| 2018/0250529 A1 | 9/2018 | Seuntjens |
| 2018/0250531 A1 | 9/2018 | Ansorge |
| 2019/0014243 A1 | 1/2019 | Malone |
| 2019/0118002 A1 | 4/2019 | Rosenwald |
| 2019/0298285 A1 | 10/2019 | Rakic |
| 2020/0101327 A1 | 4/2020 | Alquist |
| 2020/0253001 A1 | 8/2020 | Nauditt |
| 2021/0011178 A1 | 1/2021 | Kapatoes |
| 2021/0012507 A1 | 1/2021 | Kapatoes |
| 2021/0015441 A1 | 1/2021 | Bourne |
| 2021/0220676 A1 | 7/2021 | Kawrykow |
| 2021/0236856 A1 | 8/2021 | Kapatoes |

FOREIGN PATENT DOCUMENTS

| | | |
|---|---|---|
| EP | 1060726 | 12/2000 |
| EP | 1060726 B1 | 6/2004 |
| EP | 2016445 | 1/2009 |
| EP | 2078537 A1 | 7/2009 |
| EP | 2117649 A2 | 11/2009 |
| EP | 2186542 | 5/2010 |
| EP | 2400317 A1 | 12/2011 |
| EP | 2457237 | 5/2012 |
| EP | 2708919 A2 | 3/2014 |
| EP | 2865417 | 4/2015 |
| EP | 2904974 | 8/2015 |
| EP | 3074088 | 10/2016 |
| EP | 3075417 | 10/2016 |
| JP | 05154209 | 6/1993 |
| JP | 2003310590 A | 11/2003 |
| JP | 2008105882 | 5/2008 |
| JP | 2010215428 | 9/2010 |
| JP | 2010234521 | 10/2010 |
| JP | 202035449 | 3/2020 |
| WO | 2006138513 | 12/2006 |
| WO | 2008013956 | 1/2008 |
| WO | 2009114669 | 9/2009 |
| WO | 2009120494 | 10/2009 |
| WO | 2009137794 | 11/2009 |
| WO | 2011011471 | 1/2011 |
| WO | 2012053440 | 4/2012 |

(56) References Cited

FOREIGN PATENT DOCUMENTS

| | | |
|---|---|---|
| WO | 2013049839 | 4/2013 |
| WO | 2013177677 A | 12/2013 |
| WO | 2015024360 | 2/2015 |
| WO | 2015073899 | 5/2015 |
| WO | 2016172352 | 10/2016 |
| WO | 2016200463 | 12/2016 |
| WO | 2019157249 A | 8/2019 |

OTHER PUBLICATIONS

Mohan et al., "Energy and angular distributions of photons from medical linear accelerators", Med. Phys. 12, 592-597, 1985.
Otto, "Volumetric modulated arc therapy: IMRT in a single gantry arc", Med. Phys. 35, 310-317, 2008.
Papanikolaou et al., "Investigation of the convolution method for polyenergetic spectra", Med. Phys. 20, 1327-1336, 1993.
Williams, "Pyramidal Parametrics", SIGGRAPH Comput. Graph. 17, 3, 1-11, 1983.
Yan et al., "Adaptive radiation therapy", Phys. Med. Biol. 42, 123-132, 1997.
Yu, "Intensity-modulated arc therapy with dynamic multileaf collimation: an alternative to tomotherapy", Phys. Med. Biol. 40, 1435-1449, 1995.
PCT App. No. PCT/US2009/043341; International Search Report mailed Jan. 5, 2010. 3 pages.
PCT App. No. PCT/US2012/053440; International Search Report and Written Opinion mailed Mar. 26, 2014; 3 pages.
PCT App. No. PCT/US2014/065808; International Search Report and Written Opinion mailed May 21, 2015; 9 pages.
"Waterphantom Dosimetry"; Medical Physics, vol. 3, May/Jun. 1976; pp. 189.
Indra J. Das, Chee-Wai Cheng, Ronald J. Watt, Anders Ahnesjo, John Gibbons, X. Allen Li, Jessica Lowenstien, Raj K. Mitra, William E. Simon, Timothy C. Zhu; Accelerator Beam Data Commissioning Equipment and Procedures; Report of the TG-106 of the Therapy Physics Committee of the AAPM; Med. Phys. 35(9), Sep. 2008; pp. 4186-4215.
PCT App. No. PCT/US2010/042680; International Search Report mailed Jan. 27, 2011; 2 pages.
PCT App. No. PCT/US2010/042680; International Written Opinion mailed Jan. 23, 2012; 8 pages.
PCT App. No. PCT/US2009/036775; International Search Report mailed Nov. 12, 2009; 2 pages.
Benedick Fraass; "Quality Assurance for Clinical Radiotherapy Treatment Planning," Med Phys., 25(10), Oct. 1998; pp. 1773-1829.
G.J. Kutcher; "Comprehensive AQ for Radiation Oncology Report;" AAPM Radiation Therapy Committee Task Group 40; Med. Phys., 21; Apr. 1994; pp. 581-618.
MapCheck and EPIDose; www.sunnuclear.com; manufactured by Sun Nuclear Corp.; Melbourne, FL; 2010, 8 pages.
MapCALC; www.sunnuclear.com; manufactured by Sun Nuclear Corp.; Melbourne, FL; 2009, 2 pages.
Joseph O. Deasy; "A Computational Environment for Radiotherapy Research," Med. Phys. 30, (5), May 2003; pp. 979-985.
Robert M. Eisberg; "Fundamentals of Modern Physics," Chapter 9—Perturbation Theory; John Wiley & Sons; 1967; pp. 268-272.
Cyberknife; Cyberknife Systems; "The Standard of Radiosurgery", by Accuracy, Sunnyvale, CA; 2009; pp. 1-6.
"Hi-Art"; www.tomotherapy.com; TomoTherapy, Madison, WI; 2007; pp. 1-8.
"Rapid Arc"; Varian Medical Systems, Inc., Palo Alto, CA; www.varian.com; 2007; pp. 1-8.
"VMAT"; Elekta,Ltd., Crawley UK; Document No. 4513 3710770; Oct. 8, 2008, 8 pages.
D.W.O. Rogers; "Montey Carlo Techniques in Radiotherapy," Physics in Canada, Medical Physics Special Issue, v. 58 #2; 2002; pp. 63-70.

T.R. Mcnutt, T.R. Mackie, P.J. Reckwerdt, B.R. Paliwal; "Analysis and Convergence of the Iterative Convolution/Superposition Dose Reconstruction Technique,"; Med. Phys. 24(9) Sep. 1997; pp. 1465-1476.
Mathilda Van Zijtveld, Maaretn L.P. Dirkxa, Hans C.J. De Boera, and Ben J.M. Heijmen; "3D Dose Reconstruction for Clinical Evaluation of IMRT Pretreatment Verification with an EPID." Radiotherapy and Oncology, 82(2); Feb. 2007; pp. 201-201.
PCT App. No. PCT/US2009/036917; International Search Report mailed Sep. 17, 2009. 2 pages.
PCT/US2017/044472; International Search Report and Written Opinion of the International Searching Authority, or the Declaration mailed Oct. 13, 2017; 12 pages.
PCT App. No. PCT/US2017/062608; International Search Report and Written Opinion mailed Feb. 22, 2018; 11 pages.
McEwen et al.; "A portable calorimeter for measuring absorbed dose in radiotherapy clinic"; Dec. 2000; Phys. Med. Biol., vol. 45; pp. 3675-3691.
McDermott et al.; "Replacing Pretreatment Verification with In Vivo EPID Dosimetry for Prostate IMRT"; International Journal of Radiation: Oncology Biology Physics, Pergamon Press, USA, vol. 67, No. 5, Mar. 28, 2007, pp. 1568-1577, XP022101268, ISSN: 0360-3016, DOI: 10.1016/J.IJROBP.2006.11.047.
Nelms, Benjamin et al.; "Evalution of a Fast Method of EPID-based Dosimetry for Intensity-modulated Radiation Therapy"; Journal of Applied Clinical Medical Physics, Jan. 1, 2010, pp. 140-157, XP055476020.
PCT App. No. PCT/US2018/020320; International Search Report and Written Opinion mailed Jul. 24, 2018; 18 pages.
Linacre, J.K. , "Harwell Graphite Calorimeter", IAEA, vol. 47, 1970 (pp. 46-54.).
International Search Report and Written Opinion mailed Oct. 2, 2020, PCT Application No. PCT/US2020/041458.
International Search Report and Written Opinion mailed Nov. 24, 2021, PCT Application No. PCT/IB2021/057573.
International Search Report and Written Opinion mailed Sep. 1, 2023, PCT Application No. PCT/iB/2023/055991.
Jaccard, Maud, et al. "High dose-per-pulse electron beam dosimetry: commissioning of the Oriatron eRT6 prototype linear accelerator for preclinical use." Medical physics 45.2 (2018): 863-874. (Year: 2018).
Barthe, Jean. "Electronic dosimeters based on solid state detectors." Nuclear Instruments and Methods in Physics Research Section B: Beam Interactions with Materials and Atoms 184.1-2 (2001): 158-189. (Year: 2001).
Albers et al., CRC HAndbook of Chemistry and Physics, 87th Ed., Edited by R.C. Weast CRC, Cleveland, 1976. pp. F-11, D-171, E-6. (4 pages).
Almond et al. In "AAPM TG-51 Protocol for Clinical Reference Dosimetry of High Energy Photon and Electron Beams", Med. Phys. VI, 26, pp. 1847-1870, 1999.
Aspen Aerogels, Pyrogel.RTM. 2250 Datasheet (Aspen Aerogels, Inc., Northborough, 2010). 2 pages.
Berlyand et al., "Portable Calorimeter for Measuring Absorbed Doses of X-Rays and Electrons from Accelerators", translated from Izeritel'naya Teknika, No. 11, Nov. 1991, pp. 56-58.
Boutillon in "Gap Correction for the Calorimetric Measurement of Absorbed Dose in Graphite with a 60Co Beam", Phys. Med. Biol., vol. 34, pp. 1809-1821, 1989, Apr. 30, 2024.
Daures et al., "New Constant-Temperature Operating Mode for Graphite Calorimeter at LNE-LNHB", Physics in Medicine and Biology, vol. 50, 2005, No. pp. 4035-4052.
Daures et al., "Small section graphite calorimeter (CR10) at LNE-LNHB for measurement in small beams for IMRT", Metrologica, (Dec. 1, 2011), XP020229547, 5 pages.
Daures et al., "Small Section Graphite Calorimeter (GR-10) at LNE-LNHB for Measurements in Small Beams for IMRT Metrologia", vol. 49, No. 5, 2012, pp. S174-S178.
Domen et al., "A Heat-loss-Compensated Calori meter: Theory, Design, and Performance", Journal of Research of the National Bureau of Standards—A. Physics and Chemistry, vol. 78A, No. 5, Sep.-Oct. 1974, pp. 595-610.

(56) References Cited

OTHER PUBLICATIONS

Domen, "Absorbed Dose Water Calorimeter", (Med. Phys., vol. 7, 1980, pp. 157-159).
Duane et al., "An Absorbed Dose Calorimeter for IMRT Dosimetry", Metrologia, vol. 49, No. 5, 2012, pp. S168-S173.
IAEA, TRS., "398. Absorbed Dose Determination in External Beam Radiotherapy: An International Code of Practice for Dosimetry based on Standards of Absorbed Dose to Water," Vienna International Atomic Energy Agency (2000). 242 pages.
J. Seuntjens and S. Duane, "Photon absorbed dose standards," Metrologia 46, S39-S58 (2009).
Kawrakow et al. In "The EGSnrc Code System: Monte-Carlo Simulation of Electron and Photon Transport" (Canadian National Research Center, NRC Report PIRS-701, 2006.
Mc Ewen at al., 'A Portable Calorimeter for Measuring Absorbed Dose in the Radiotherapy Clinic', Physics in Medicine and Biology, vol. 45, No. 12, Dec. 2000, pp. 3675-3691.
McDonald et al., "Portable Tissue Equivalent Calorimeter", Medical Physics, vol. 3, 2, Mar.-Apr. 1976, pp. 80-86.
McEwen et al., "Portable Graphite Calorimeter for Measuring Absorbed Dose in the Radiotherapy Clinic", Standards and Codes of Practice in Medical Radiation Dosimetry,IAEA-CN-96-9P,2002, pp. 115-121.
Miller, "Polystyrene Calorimeter for Electron Beam Dose Measurements", Radiation Physics Chemistry vol. 46, No. 4-6, Aug. 1995, pp. 1243-1246.
Myers et al., "Precision Adiabatic Gamma-Ray Calorimeter using Thermistor Thermometry", Review of Scientific Instruments, vol. 32, No. 9, Sep. 1961, pp. 1013-1015.
Nutbrown et. "Evaluation of Factors to Convert Absorbed Dose Calibrations in Graphite to Water for Mega-Voltage Photon Beams" (UK National Pysical Laboratory, NPL Report CIRM 37, 2000. 45 pages.
Ostrowsky et al., "The Construction of the Graphite Calorimeter GR9 at LNE-LNHB (Geometrical and technical considerations)", Report CEA-R-6184, 2008, 52 pages.
Owen et al "Correction for the Effect of the Gaps around the Core of an Absorbed Dose Graphite Calorimeter in High Energy Photon Radiation" (Phys. Med. Biol., vol. 36, pp. 1699-1704, 1991.
Palmans et al., "A Small-Body Portable Graphite Calorimeter for Dosimetry in Low-Energy Clinical Proton Beams", Physics in Medicine and Biology, vol. 49, No. 16, Aug. 2004, pp. 3737-3749.
Petree et al., "A Comparison of Absorbed Dose Determinations in Graphite by Cavity Ionization Measurements and by Calorimetry", Journal of Research of the National Bureau of Standards—C. Engineering and Instrumentation. vol. 71 C, No. 1, Jan.-Mar. 1967, pp. 19-27.
Picard et al., "Construction of an Absorbed-Dose Graphite Calorimeter", Report BIPM-09/01' May 2009, 12 pages.
R. Alfonso et al., 'A new formalism for reference dosimetry of small and nonstandard fields,' Med. Phys. 35, 5179-5186 (2008).
Renaud et al., "Development of a graphite probe calorimeter for absolute clinical dosimetry", Med. Phvs., (Jan. 9, 2013), vol. 40, No. 2, p. 020701, XP012170941, 6 pages.
Rogers, "The physics of AAPM's TG-51 protocol," in Clinical Dosimetry Measurements in Radiotherapy, Medical Physics Monograph No. 34, edited by D. W. O. Rogers and J. E. Cygler (Medical Physics Publishing, Madison, WI, 2009), pp. 239-298.
Ross et al. In "Water Calorimetry for Radiation Dosimetry" (Phys. Med. Biol., 1996, vol. 41, pp. 1-29).
S. Picard, D. T. Burns, and P. Roger, "Determination of the specific heat capacity of a graphite sample using absolute and differential methods," Metrologia 44, 294-302 (2007).
Sander et al., "NPL's new absorbed dose standard for the calibration of HDR 192Ir brachytherapy sources," Metrologia 49, S184-S188 (2012).
Seuntjens et al., Review of Calorimeter Based Absorbed Dose to Water Standards, Standards and Codes of Practice in Medical Radiation Dosimetry, IAEA-CN-96-3, 2002 p. 37-66.
Stewart in "The Development of New Devices for Accurate Radiation Dose Measurement: A garded Liquid Ionization Chamber and an Electron Sealed Water Calorimeter" Ph. D. Dissertation McGill University, 2007.
Sundara et al., "Graphite Calorimeter in Water and Calibration of Ionization Chambers in Dose to Water for 60Co Gamma Radiation", Medical Physics, vol. 7, No. 3, May-Jun. 1980, pp. 196-201.
Witzani et al., "A Graphite Absorbed-Dose Calorimeter in the Quasi-Isothermal Mode of Operation", Metrologia, vol. 20, No. 3, 1984, pp. 73-79.
Y. Morishita et al., "A standard for absorbed dose rate to water in a 60Co field using a graphite calorimeter at the national metrology institute of Japan," Radiat. Prot. Dosim. 1-9 (2012) (published E-first Sep. 5, 2012).
Brusasco, C, et al. 'A Dosimetry System for Fast Measurement of 3D Depth-dose Profiles in Charged-particle Tumor Therapy with Scanning Techniques.' Nuclear Instruments & Methods In Physics Research, Section—B: Beam Interactions With Materials And Atom 168.4 (2000): 578-92.
PCT App. No. PCT/US2015/024360; International Search Report and Written Opinion mailed Oct. 8, 2015; 13 page.
Nelms, Benjamin. "Variation in External Beam Treatment, Plan Quality: An Inter-institutional Study of Planners and Planning Systems." Practical Radiation Oncology 2.4 (2012): 296-305.
Mackie et al., "Photon Beam Dose Computations", Proceedings of the 1996 AAPM Summer School, 1996. 36 pages.
PCT App. No. PCT/US2012/058345; International Search Report mailed Apr. 17, 2013; 3 pages.
Ahnesjo et al., "Calculation and Application of Point Spread Functions for Treatment Planning with High Energy Photon Beams", Acta. Oncol., 26, 49-56, 1987.
Ahnesjo et al., "Dose calculations for external photon beams in radiotherapy", Phys. Med. Biol. 44, R99-R155 1999.
Ahnesjo, "Collapsed Cone Convolution of Radiant Energy for Photon Dose Calculation in Heterogeneous Media", Med. Phys. 16, 577-92, 1989.
Amanatides et al., "A Fast Voxel Traversal Algorithm for Ray Tracing", Eurographics '87, Conference Proceedings, 1987, 10 pages.
Liu et al., "Correcting kernel tilting and hardening in convolution/ superposition dose calculations for clinical devergent and polychomatic photon beams", Med. Phys. 24, 1729-1741, 1997.
Lu et al., "Accurate convolution/superposition for multi-resolution dose calculation using cumulative tabulated kernels", Phys. Med. Biol. 50, 655-680, 2005.
Mackie et al., The Use of Comp. In Rad. Ther., 107-110 1987.
Mackie et al., "Generation of Photon Energy Deposition Kernels Using the EGS Monte Carlo Code," 1988, Phys. Med. Biol. 33, pp. 1-20.

\* cited by examiner

ADJUSTABLE RADIATION DETECTOR SUPPORT

RELATED APPLICATION(S)

This application claims priority to and the benefit of U.S. Provisional Application No. 63/493,263, filed Mar. 30, 2023, titled "Adjustable Radiation Detector Support," which is hereby incorporated by reference.

DESCRIPTION OF THE RELATED ART

Radiation detectors are used in radiation therapy quality assurance to measure the output of radiation therapy devices and/or amounts of radiation reaching a particular location in a patient or phantom. Radiation detectors can be mounted at known locations to provide measurements that can be compared with models of radiation dose or with a calibrated output of a radiation therapy device.

SUMMARY

Disclosed is a system for performing radiation therapy quality assurance. The system includes a tank, a drive system configured to move a radiation detector in three dimensions within the tank, and an adjustable radiation detector support configured to be coupled to the drive system. The adjustable radiation detector support has an aperture for receiving a radiation detector, the aperture having an axis. The adjustable radiation detector support is further configured to translate the radiation detector in an axial direction relative to the adjustable radiation detector support.

In some embodiments, the tank can be cylindrical and the drive system can include a vertical drive, a radial drive, and an angular drive.

In other embodiments, the adjustable radiation detector support can further include a housing and a sleeve configured to fit at least partially within the housing, the sleeve having a sleeve aperture configured to receive and hold the radiation detector.

In other yet embodiments, the adjustable radiation detector support can further include an adjustable nut configured to turn within the housing and including a nut aperture with interior threads configured to mate with exterior threads on the sleeve, where the adjustable radiation detector support can be configured so that turning the adjustable nut causes the sleeve and the radiation detector to translate in an axial direction relative to the housing.

In some embodiments, the sleeve can include a clamping portion extending around the sleeve aperture and having an axial split. There can be a clamping flange extending from the clamping portion and including a threaded hole. A thumbscrew can have a threaded section that is inserted into the threaded hole, where turning the thumbscrew causes the clamping flange to compress the clamping portion.

In other embodiments, an adapter can be configured to fit within the sleeve aperture and have a detector aperture configured to receive the radiation detector. A slot can be configured to allow the detector aperture to compress around the radiation detector responsive to compression by the sleeve.

In yet other embodiments, a trolley can be configured to be coupled with the drive system and coupled with the adjustable radiation detector support. In some embodiments, the trolley can include a magnet configured to facilitate holding the adjustable radiation detector support in place on the trolley. In other embodiments, the magnet can have a magnet strength and location such that the magnet does not interfere with operation of the radiation detector.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also contemplated that may include one or more processors and one or more memories coupled to the one or more processors. A memory, which can include a computer-readable storage medium, may include, encode, store, or the like, one or more programs that cause one or more processors to perform one or more of the operations described herein. Computer implemented methods consistent with one or more implementations of the current subject matter can be implemented by one or more data processors residing in a single computing system or across multiple computing systems. Such multiple computing systems can be connected and can exchange data and/or commands or other instructions or the like via one or more connections, including but not limited to a connection over a network (e.g., the internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to particular implementations, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Radiation delivery systems (e.g., linear accelerators, radioisotope sources, etc.) can be used, for example, to deliver radiation therapy to patients. The amount and location of radiation delivered can be specified by a radiation treatment plan, which can include specific instructions for how and under what configuration a radiation delivery system is to be operated. Before or between radiation therapy treatments, a radiation delivery system can be calibrated to ensure that the radiation is delivered as intended. These calibrations can include characterizing the radiation beam (e.g., fluence, homogeneity, energy, etc.). As part of such calibrations, a phantom can be used to provide a volume to receive radiation. Phantoms can be, for example, water phantoms, solid water phantoms or water-equivalent phantoms. The phantoms can be circular (cylindrical), rectangular, or anthropomorphic-shaped. Radiation detectors can be used in or around the phantom to measure a delivered radiation dose for comparison with expected radiation output. Accordingly, the systems, computer program products, and methods described herein provide embodiments that can, among other things, enable accurate measurements of radiation.

Figure 1:
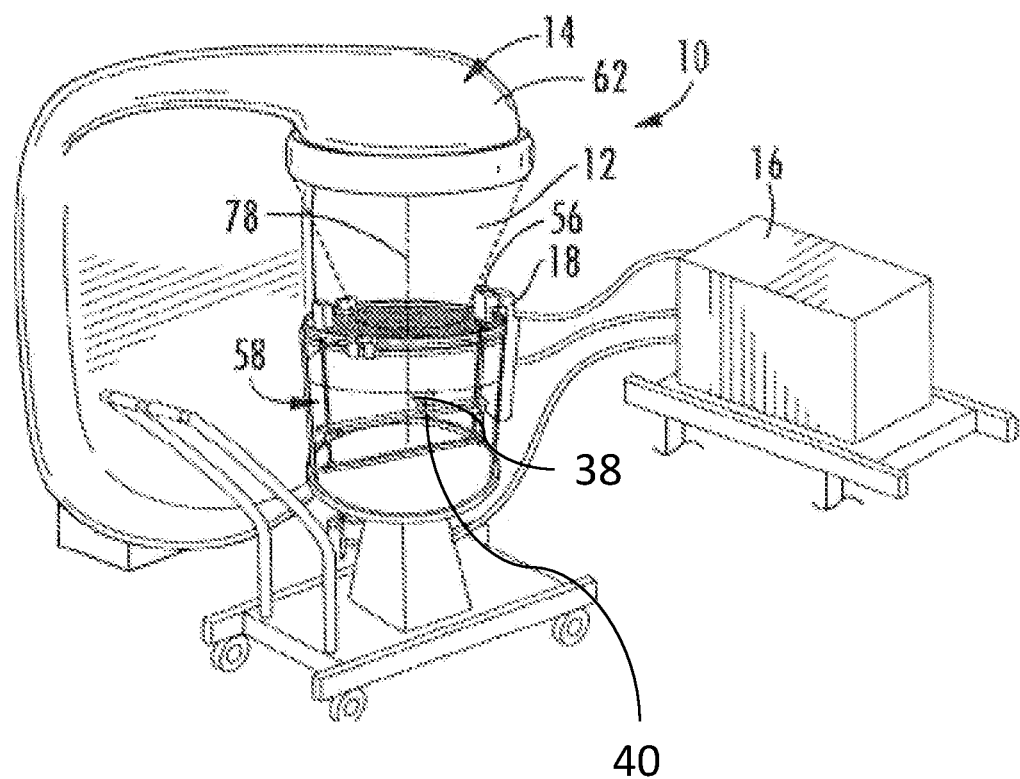
FIG. 1 is a simplified diagram of an exemplary radiation source and exemplary scanning system with a radiation detector in accordance with certain aspects of the present disclosure.

FIG. 1 is a simplified diagram of an exemplary radiation source 14 and exemplary scanning system 10 with a radiation detector 38. Radiation detector 38 can be provided for measuring radiation 12 emitted from radiation source 14, for example along central axis 78. Types of radiation detectors can include, for example, gaseous ionization detectors, ionization chambers, proportional counters, scintillation counters, semiconductor detectors, dosimeters (e.g., films), or electroscopes or electrometers. As illustrated in FIG. 1, scanning system 10 can include radiation detector 38 and can be configured to enable movement of radiation detector 38 on trolley 40 inside phantom 58. To effect movement of radiation detector 38, scanning system 10 can include a drive system having any combination of drives, including, for example, linear drives, angular drives, diameter drives, vertical drives, horizontal or radial drives, etc. Scanning system 10 can also include tracks, belts, gears, motors, or the like to allow positioning of radiation detector 38. Scanning system 10 can also be connected to a processor 16 having analysis and data storage capabilities and controller 18 operable with the processor.

Figure 2:
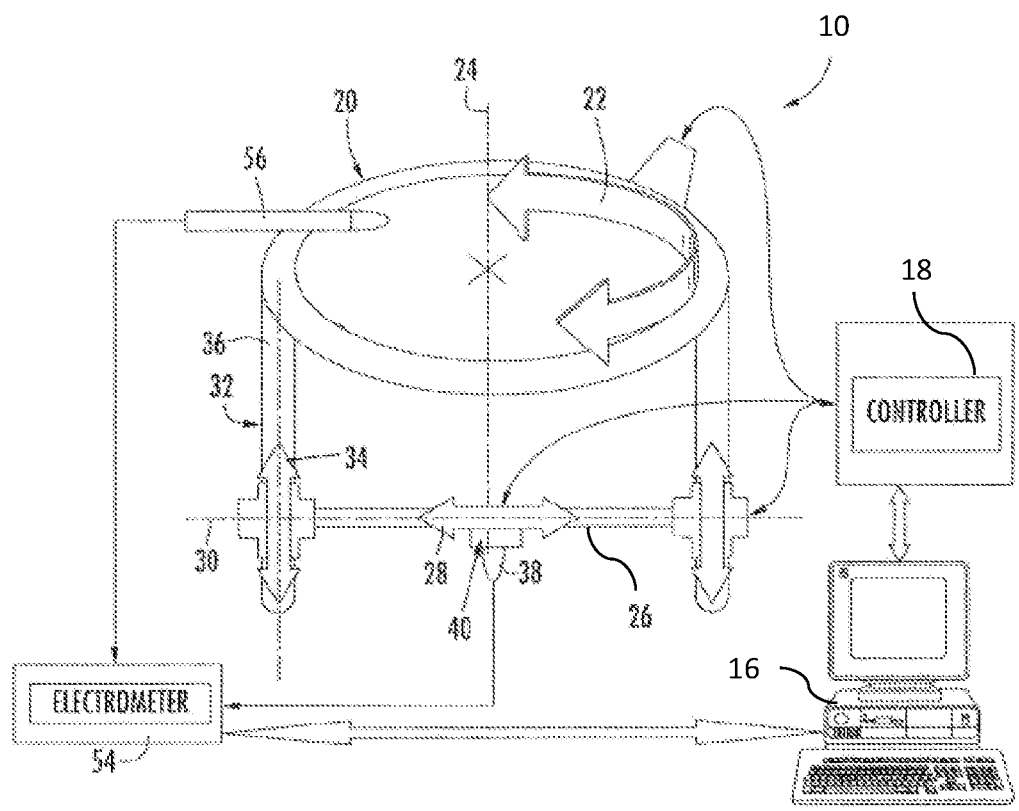
FIG. 2 is a simplified diagram of the exemplary scanning system having multiple drives in accordance with certain aspects of the present disclosure.

FIG. 2 is a simplified diagram of exemplary scanning system 10 having multiple drives. With reference to the exemplary system depicted in FIG. 2, angular drive 20 can be operable with controller 18 for providing a rotational movement 22 about first axis 24 responsive to commands from the controller. Radial drive 26 can be operable with controller 18 for providing radial/horizontal movement 28 along second axis 30. By way of example, radial drive 26 can be operable with angular drive 20 for providing rotational movement 22 at different radii. Vertical drive 32 can be operable with controller 18 for providing vertical movement 34 of radial drive 26 along third axis 36 responsive to commands from controller 18. Radiation detector 38 can be carried by trolley 40 affixed to radial drive 26 for locating it along radial drive 26 by horizontal movement 28. Radiation detector 38 can provide sensing signals to processor 16 for selected locations of the radiation detector when orientated through the circular (rotational), horizontal, and vertical movements 22, 28, 34 along the first, second and third axes 24, 30, 36, respectively, as a result of commands from controller 18. As used herein, the term "drive" refers to motors, tracks, belts, bearings, etc., that enable the desired motion associated with the drive (e.g., horizontal, vertical, rotational).

With reference again to FIG. 2, scanning system 10 can include electrometer 54 operable between processor 16 and radiation detector 38. In addition, a reference detector 56 can be located at a fixed location for comparing the sensing signals from the radiation detector 38 to the reference detector 56. As illustrated with reference again to FIG. 1, a cylindrical water tank 58 carrying water (one example of a "phantom") can be dimensioned for movement of the radiation detector 38 and drives 20, 26, 32 described above. While a circular cross-section water tank 58 is shown, the technologies of the present disclosure are contemplated to be applicable to other shapes and types of tanks/phantoms, for example, square, rectangular, hexagonal, etc. Controller 18 can be capable of communicating movement commands and receiving encoder information from the motors and bi-directional communication of movement command and encoder position data to programmable processor 16.

The embodiment described herein is by way of example only for application to a cylindrical phantom/scanning system. However, other geometrically shaped vessels (e.g., square, rectangular) may be employed without compromising the benefits of the scanning system 10. The scanning system can be a Cartesian scanning system where instead of angular drive 20, there can be two horizontal drives (e.g., corresponding to an X axis and a Y axis), which, when combined with vertical drive 32, can also provide three-dimensional movement of radiation detector 38.

During scans, the phantom/vessel may contain water, or air scans can be performed with an empty vessel. Scanning system 10 may also be implemented without a vessel and assembled in a self-supporting frame that rests on a treatment couch or may be mounted to the head of radiation source 14 for testing radiation beam characteristics as gantry 62 is moved.

Figure 3:
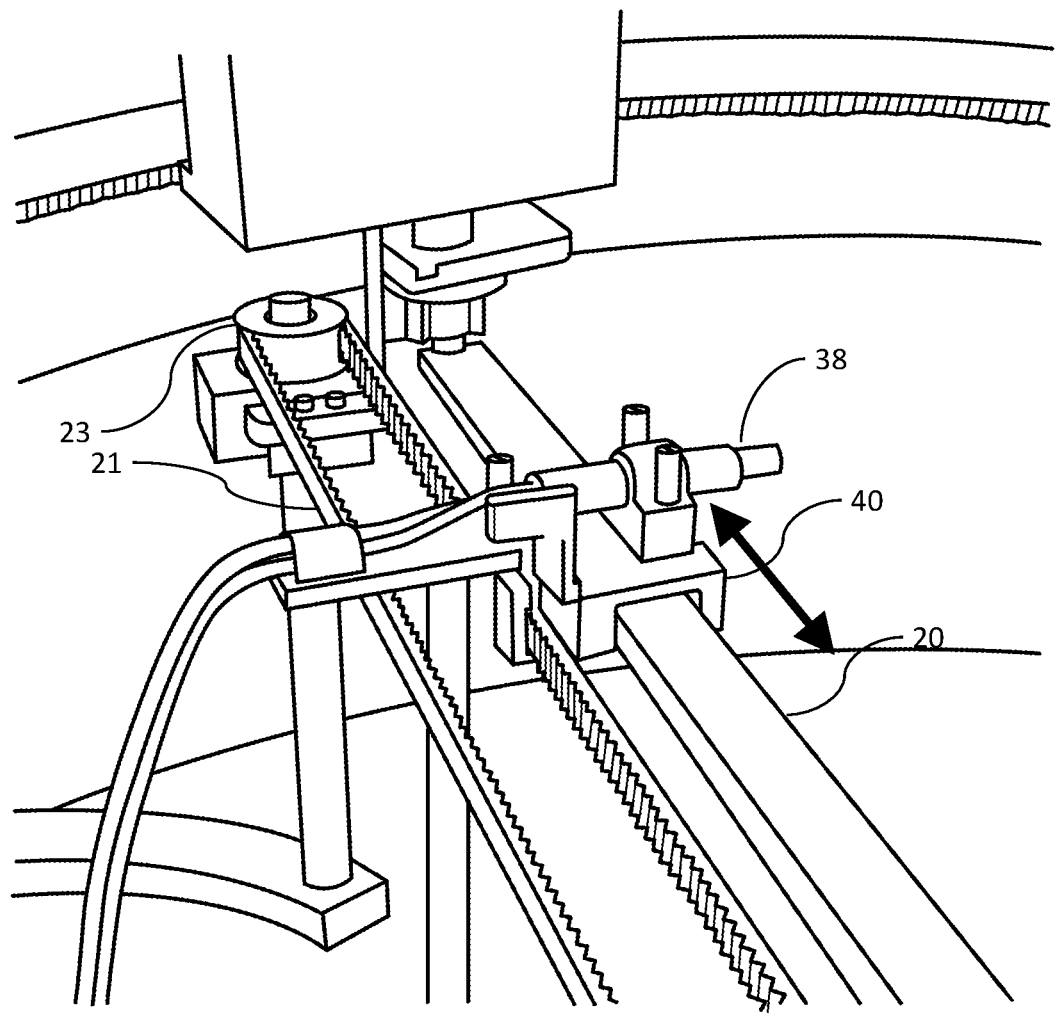
FIG. 3 is a simplified diagram of an exemplary trolley coupled to a radial drive to the position a radiation detector in accordance with certain aspects of the present disclosure.

FIG. 3 is a simplified diagram of an exemplary trolley 40 coupled to radial drive 20 to position radiation detector 38. The trolley 40 can be moved in the radial direction (shown by the double arrow) by a belt 21 driven by a motorized pulley or gear (with driven pulley 23 depicted in FIG. 3). In one embodiment, radiation detector 38 can be affixed (e.g., clamped) to trolley 40 as shown.

Figure 4:
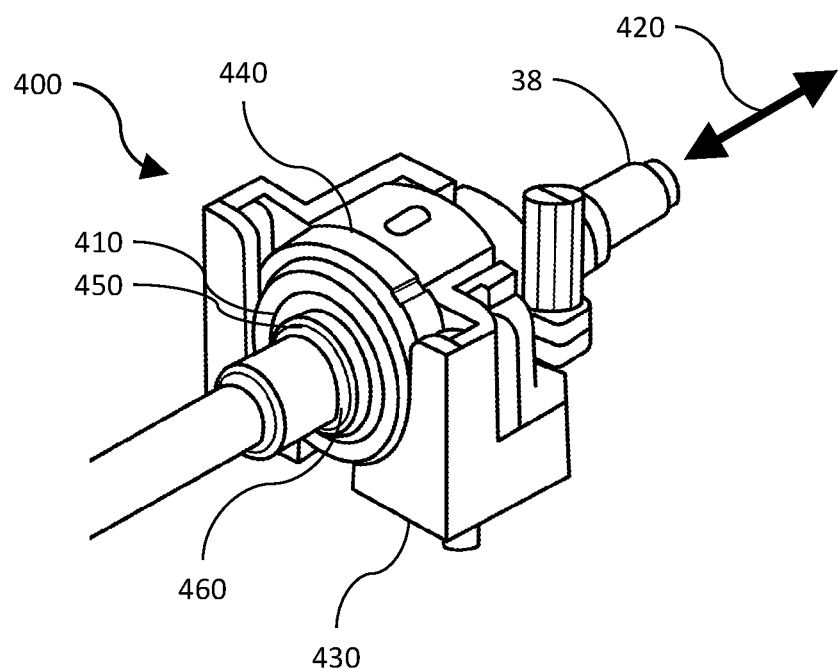
FIG. 4 is a simplified diagram of an exemplary adjustable radiation detector support in accordance with certain aspects of the present disclosure.

FIG. 4 is a simplified diagram of an exemplary adjustable radiation detector support. FIGS. 1-3 showed that some embodiments of a system for performing radiation therapy quality assurance can include a tank 58 and a drive system configured to move a radiation detector in three dimensions within the tank. FIG. 4 depicts an adjustable radiation detector support 400 that can be coupled to the drive system (e.g., radial drive 26) to allow positioning within the tank along one or more drive axes.

To allow fine positioning of the radiation detector, such systems can include an adjustable radiation detector support 400 as shown in the example of FIG. 4. As used herein, an "adjustable" radiation detector support means that the position of the radiation detector in the adjustable radiation detector support 400 is adjustable by operation of one or more devices, as opposed to being adjustable by only manual positioning and clamping (e.g., the hand of a user sliding the radiation detector in and out of the support manually).

The adjustable radiation detector support can allow adjustment of the location of radiation detector 38. The adjustable radiation detector support 400 can include an aperture 410 (generally an opening or part of an opening) for receiving radiation detector 38, with the aperture 410 having an axis 420 along which the radiation detector position can be adjusted. Accordingly, the adjustable radiation detector support 400 can be configured to translate the radiation detector 38 in an axial direction (along axis 420) relative to the adjustable radiation detector support 400. In this example, axis 420 is perpendicular to the radial axis depicted in FIG. 3, though in other embodiments the adjustable radiation detector support 400 can be oriented as desired to enable adjustment in any direction.

The major components of an exemplary adjustable radiation detector support 400 are shown in FIG. 4 and include housing 430, adjustable nut 440 (to adjust the radiation detector position), sleeve 450 (to hold the radiation detector), and adapter 460 (if needed for a radiation detector of a particular size). These components, among others, are described in greater detail herein. Also, not every depicted component is necessary for every embodiment. For example, some embodiments may not include adapter 460, if not needed to hold radiation detector 38 securely in sleeve 450. The present disclosure contemplates that the adjustable radiation detector supports described herein may be provided alone (e.g., separate from a tank or a drive system), and certainly can be provided without a radiation detector itself.

Figure 5:
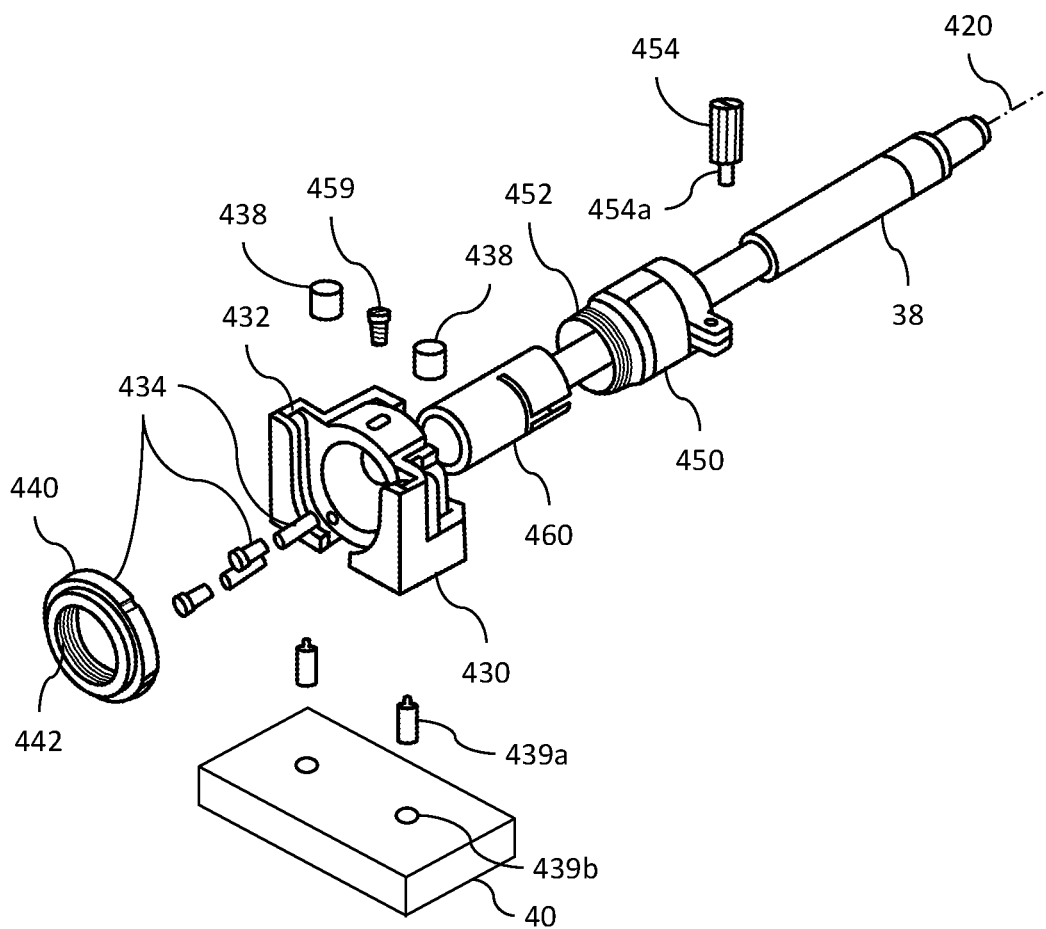
FIG. 5 is an exploded view of the exemplary adjustable radiation detector support of FIG. 4 in accordance with certain aspects of the present disclosure.

FIG. 5 is an exploded view of the exemplary adjustable radiation detector support of FIG. 4. Housing 430 can be configured to be mountable to the system (e.g., at trolley 40). Housing 430 can also include a channel 432 that can be configured to accept an adjustable nut 440 and allow it to rotate within the channel. As explained further herein, adjustable nut 440 can utilize interior threads 442 to engage sleeve 450 having complementary exterior threads 452. Accordingly, rotation of adjustable nut 440 causes precise axial movement of sleeve 450. As further shown in the example, an adapter 460 can be utilized to secure radiation detector 38 within sleeve 450 in situations where radiation detector 38 may be smaller than the sleeve 450.

Other components depicted in FIG. 5, and explained further herein, include detents 434 (comprised of, e.g., spring-loaded plungers engaging indentations on the adjustable nut 440), translation indicator 459, and at least one magnet 438 and/or dowel 439a and dowel receptacle 439b that can be utilized with housing 430 to facilitate securing housing 430 to trolley 40. Also shown is thumbscrew 454 with threaded section 454a that can be configured to tighten sleeve 450 about adapter 460 to secure radiation detector 38 within the sleeve 450 (or to tighten sleeve 450 about the radiation detector 38 itself if no adapter 460 is used).

Figure 6A:
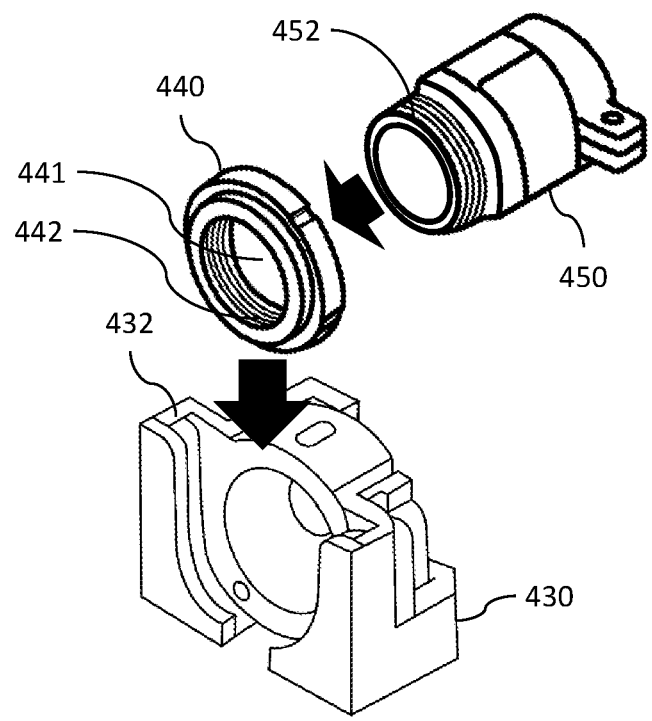
FIG. 6A is an enlarged view of a housing that holds an adjustable nut in accordance with certain aspects of the present disclosure.

FIG. 6A is an enlarged view of the housing 430 that holds adjustable nut 440. As shown in FIG. 5, the adjustable radiation detector support can include adjustable nut 440 that can be configured to turn within housing 430, such as within channel 432 formed in housing 430. Adjustable nut 440 can include a nut aperture 441 with interior threads 442 configured to mate with complementary exterior threads 452 on sleeve 450. Accordingly, the adjustable radiation detector support can thus be configured so that turning the adjustable nut 440 causes the sleeve 450 and the radiation detector 38 to translate in an axial direction relative to the housing 430. In some embodiments, the system can be configured to limit the total amount of travel of radiation detector 38. For example, the exterior threads of the sleeve 450 can have a pitch and a length that causes the adjustable nut 440 to be able to translate the sleeve±0.5, 1.0, or 1.5 mm axially from a center position as detents 434 engage indentations 444 on the adjustable nut 440.

Figure 6B:
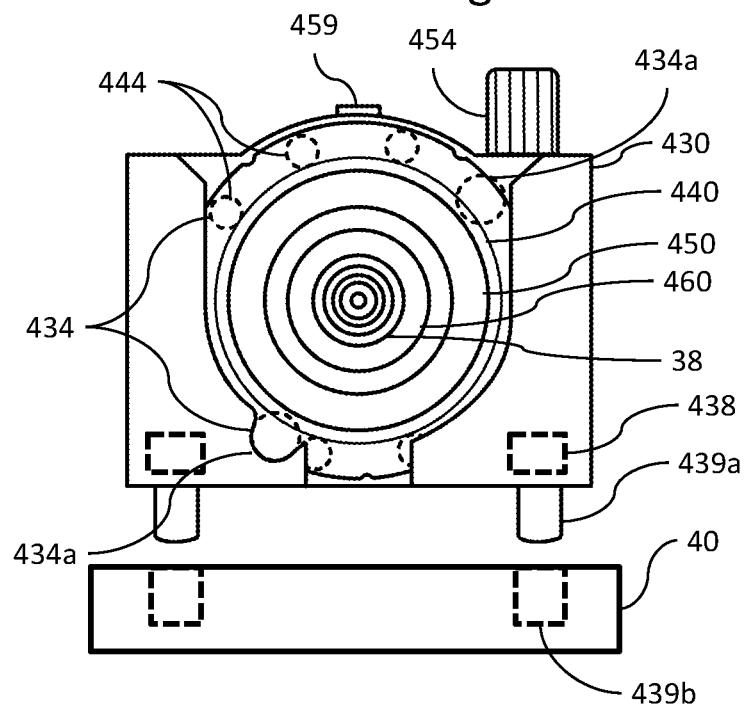
FIG. 6B is an end view of the housing and adjustable nut of FIG. 6A that depicts detents in accordance with certain aspects of the present disclosure.

FIG. 6B is a simplified diagram of an end view of an exemplary adjustable radiation detector support with housing 430 and adjustable nut 440, which also depicts detents 434. In some embodiments, an adjustable radiation detector support can include detents 434 configured to provide regulated positioning of sleeve 450. Detents can allow the adjustable radiation detector support to halt (or resist) further adjustment in specific increments. To provide such functionality, some embodiments of detents 434 can include a spring-loaded plunger 434a coupled to the housing 430 to engage indentations 444 on the adjustable nut 440. The regulated positioning resistance can thus be caused when the spring-loaded plunger 434a aligns with one of the indentations 444. In various embodiments, there can be any configuration of detents that provide various positions where the resistance occurs. In some embodiments, the detents can be configured to provide the regulated positioning in increments of 0.025, 0.05, or 0.07 mm of axial travel of the sleeve. As shown in the example of FIG. 6B, the two spring-loaded plungers may be placed at an angle that is not 180° apart, thus providing additional resistance at adjustable nut positions of approximately half the angular distance between the indentations 444 on the adjustable nut 440.

As shown in FIG. 6B, the adjustable radiation detector support can have a housing 430 with at least one dowel 439a (or dowel receptacle 439b) in the housing 430 configured to hold the adjustable radiation detector support in place on a trolley 40 configured to be coupled with the drive system. In the example of FIG. 6B, the dowels 439a extend from the housing 430 into dowel receptacles 439b in the trolley 40. As used herein, holding the adjustable radiation detector support in place means having the housing 430 be in the proper location but able to be disengaged, rather than being permanently affixed to the trolley 40.

In some embodiments, the adjustable radiation detector support can also include a magnet 438 configured to facilitate holding the adjustable radiation detector support in place on the trolley 40. The magnet(s) 438 can be on the bottom of the housing or embedded or positioned within the housing such that the magnet 438 can engage a metallic trolley (or a corresponding magnet/metal piece within a trolley) to facilitate snapping/securing the housing to the trolley 40. In some embodiments, the magnet can have a magnet strength and location such that the magnet does not interfere with operation of the radiation detector—which may be sensitive to magnetic fields.

In other embodiments, the above disposition of magnets can be reversed, with such embodiments including trolley 40 configured to be coupled with the drive system and coupled with the adjustable radiation detector support. Here, trolley 40 can include a magnet 438 configured to facilitate holding the adjustable radiation detector support in place on trolley 40. Similar to the previous embodiment, the magnet 438 can have a magnet strength and location such that the magnet 438 does not interfere with operation of the radiation detector 38. Also, the trolley can include at least one dowel or dowel receptacle configured to hold the adjustable radiation detector support in place on the trolley 40. In yet other embodiments, the magnets can be located in housing 430 and the dowels extending upward from the trolley, or vice versa.

Figure 7:
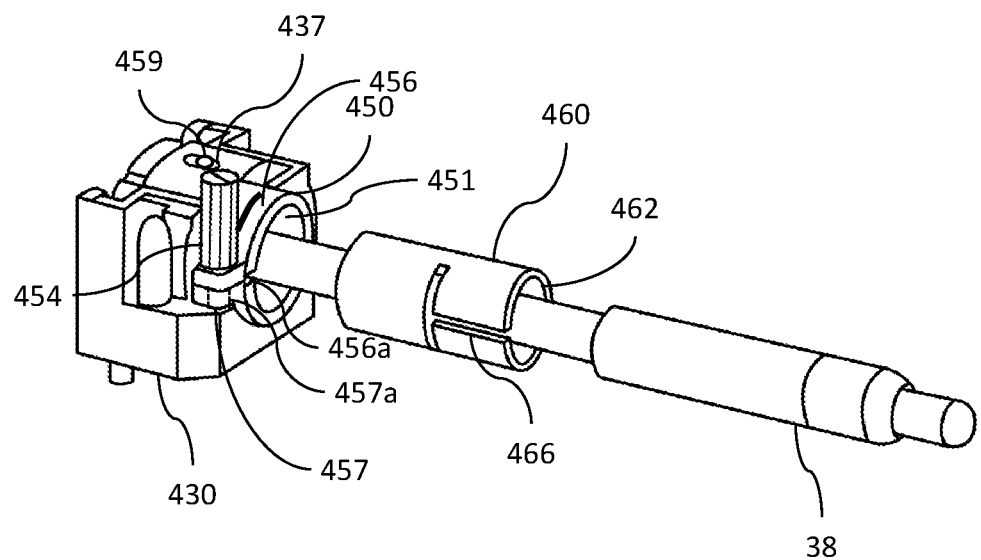
FIG. 7 is a perspective view of an exemplary adjustable radiation detector support depicting a sleeve utilized with an adapter to hold a radiation detector in accordance with certain aspects of the present disclosure.

FIG. 7 is a perspective view of an exemplary adjustable radiation detector support depicting a sleeve to hold a radiation detector. As shown, some embodiments can include a housing 430 and a sleeve 450 configured to fit at least partially within the housing. The sleeve 450 can include a sleeve aperture 451 configured to receive and hold the radiation detector 38. As used herein, the term "hold" doesn't require the sleeve to directly hold or touch the radiation detector. For example, as described further herein, "hold" may instead refer to the sleeve directly holding an adapter placed around the radiation detector.

Sleeve 450 can include a clamping portion 456 extending around the sleeve aperture 451 and have an axial split 456a that allows the sleeve to be compressed onto the radiation detector 38 or an adapter. Sleeve 450 can also include a clamping flange 457 extending from the clamping portion and including a threaded hole 457a in the clamping flange 457. Clamping portion 456 can thus actually include two flanges, but only one is threaded. Thumbscrew 454 can have a threaded section 454a (shown in FIG. 5) and that is inserted into the threaded hole 457a, where turning the thumbscrew 454 causes the clamping flange 457 to compress the clamping portion 456.

In some embodiments, the sleeve can also include a translation indicator 459 configured to be visible via a translation slot 437 formed in the housing, the translation indicator providing a visual indication of a position of the radiation detector 38 relative to a center position. In some embodiments, translation indicator 459 can be a screw or post that extends from the sleeve into or through translation slot 437 where it can be seen to provide the visual indication.

Adapter 460 can be configured to fit within sleeve aperture 451. Adapter 460 can also include a detector aperture 462 configured to receive the radiation detector 38. Slot 466 in adapter 460 can allow the detector aperture to compress around the radiation detector 38 responsive to compression by sleeve 450. In various embodiments, different detector apertures can be utilized to accommodate differently sized radiation detectors. For example, the detector aperture 462 can be 10 mm in diameter to hold a radiation detector having a 10 mm diameter, the detector aperture can be 6 mm in diameter to hold a radiation detector having a 6 mm diameter, etc. In some cases, the radiation detector may not have a circular cross-section, but the adapter can be configured to hold such radiation detectors. For example, detector aperture 462 can be rectangular to hold a radiation detector having a rectangular cross section.

Figure 8:
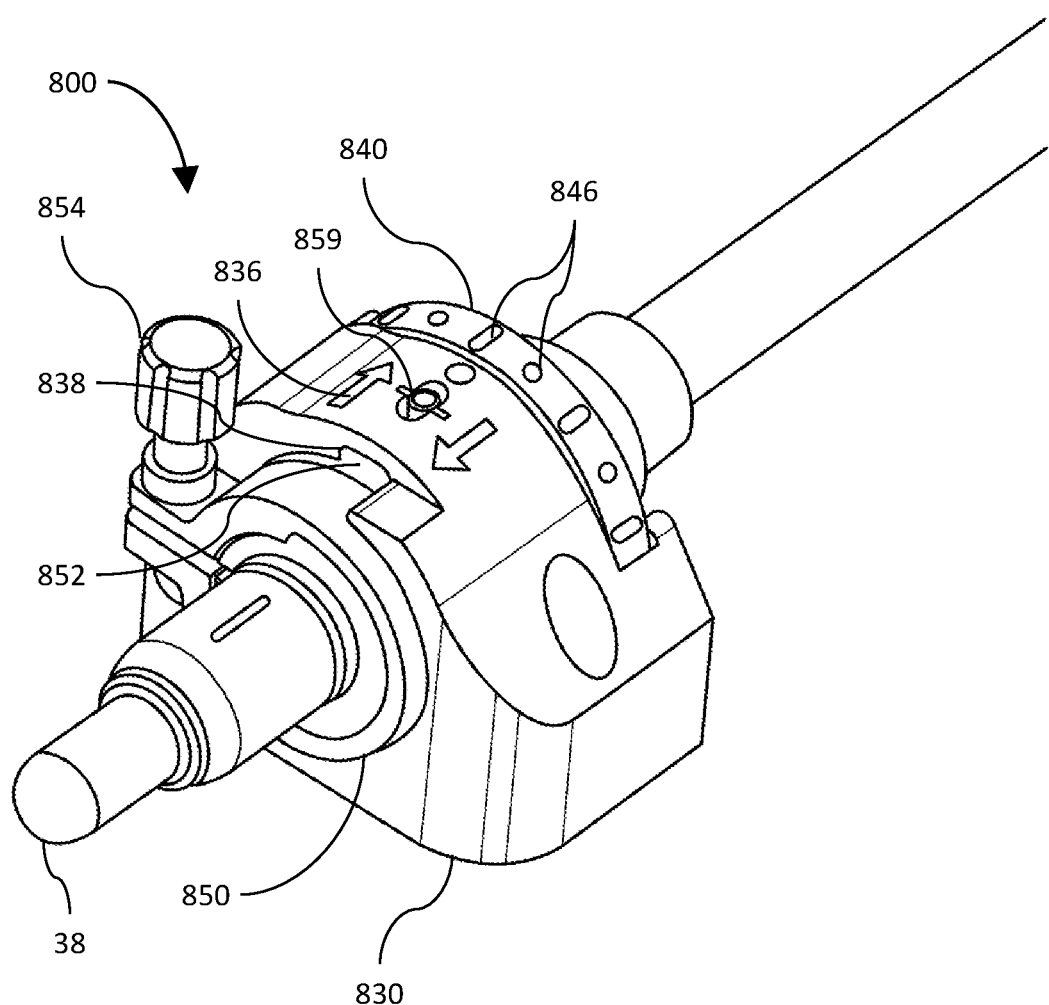
FIG. 8 is a simplified diagram of another embodiment of an exemplary adjustable radiation detector support in accordance with certain aspects of the present disclosure.
Figure 9:
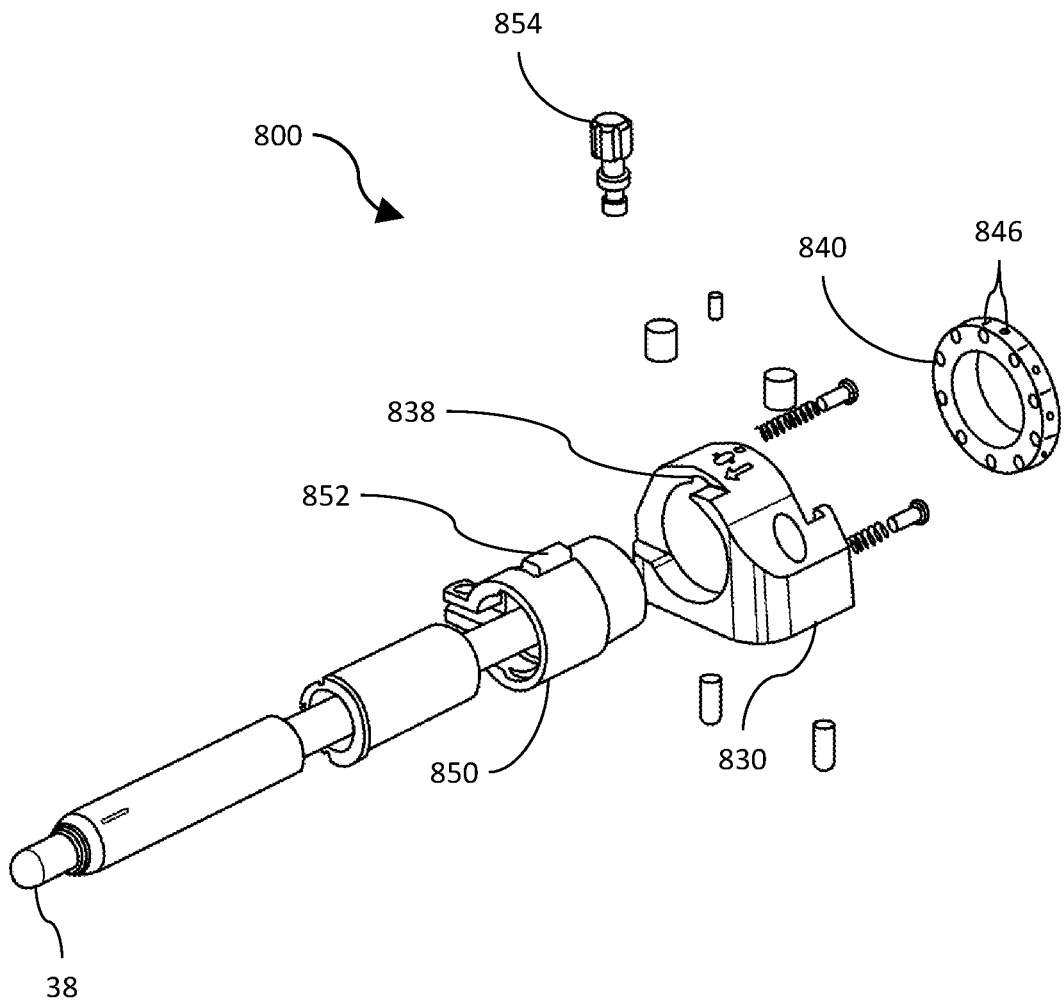
FIG. 9 is an exploded view of the embodiment of FIG. 8 in accordance with certain aspects of the present disclosure.

FIG. 8 is a simplified diagram of another embodiment of an exemplary adjustable radiation detector support 800. FIG. 9 is an exploded view of the embodiment of FIG. 8. This embodiment is similar to the previous embodiments shown in FIGS. 3-7 but with some modifications to the housing and sleeve. Accordingly, similar components may be substantially the same as those elsewhere herein except as described below. Housing 830 can include smooth transitions between surfaces for a safer and more ergonomic design. Also, housing 830 can include a slot for a translation indicator 859 that can show the incremental translation of the radiation detector 38. Adjustable nut 840 can also be similar to adjustable nut 440, but in this embodiment can include indicators 846 (e.g., lines, dots, indents, protrusions, etc.) at regular intervals representing a degree of translation of the radiation detector 38. For example, turning adjustable nut 840 between two indicators may translate radiation detector 38 an amount such as 0.02 mm, 0.05 mm, 0.1 mm, etc. In some embodiments, housing 830 can include visual indicia 836 (shown in FIG. 8 as arrows proximate translation indicator 859) that aid the user in knowing the direction of translation given a direction of rotation of adjustable nut 840. For example, when adjustable nut 840 is translated towards a forward-oriented arrow (e.g., clockwise in FIG. 8), then that arrow indicates the direction of translation of the radiation detector 38.

In some embodiments, as shown with adjustable radiation detector support 800, housing 830 can also include a locking recess 838 configured to engage locking protrusion 852 of sleeve 850. Such a feature can facilitate assembly of adjustable radiation detector support 800 (e.g., such that sleeve 850 is properly oriented to receive thumbscrew 854 for tightening). Solenoid embodiment (FIG. 10)

Figure 10:
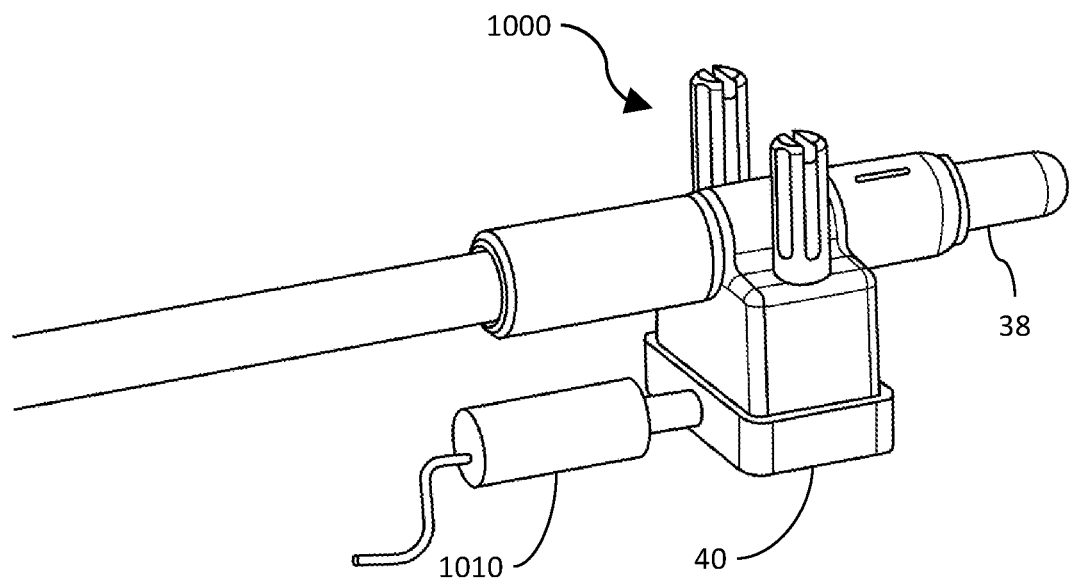
FIG. 10 is a simplified diagram of an embodiment utilizing an exemplary solenoid for actuation in accordance with certain aspects of the present disclosure.

FIG. 10 is a simplified diagram of an embodiment utilizing an exemplary solenoid for actuation. While the above-described embodiments utilize an adjustable nut to provide for positioning of the radiation detector, other embodiments can utilize different mechanisms that may also accomplish precise axial positioning of radiation detector 38. For example, a solenoid-based actuator can be utilized. In some embodiments, a programmable solenoid 1010 can be attached to trolley 40 of adjustable radiation detector support 1000. As solenoid 1010 moves in and out the programmed distance, the adjustable radiation detector support 1000 can move with it to precisely position radiation detector 38. In one exemplary implementation, the adjustable radiation detector support can have a housing with a winding coupled to the housing and configured to generate an axial magnetic field having a strength and direction based on an electrical current in the winding. Similar to prior embodiments, there can be a sleeve configured to fit at least partially within the housing, with the sleeve including a sleeve aperture configured to receive and hold the radiation detector. In this embodiment, the sleeve can also include a metallic portion configured to interact with the axial magnetic field, where the current causes the sleeve to translate in an axial direction relative to the housing in response to the generated axial magnetic field.

In some embodiments, a voice coil or a non-commutated DC linear actuator can also be used. By controlling the current/voltage to the voice coil via a computer or other programming mechanism the voice coil can provide a very fine level of adjustment of the radiation detector. The voice coil can be connected to the adjustable radiation detector support to provide actuation similar to the solenoid embodiment described above. In other embodiments, the voice coil can be connected to the sleeve to actuate the sleeve inside the housing.

Figure 11:
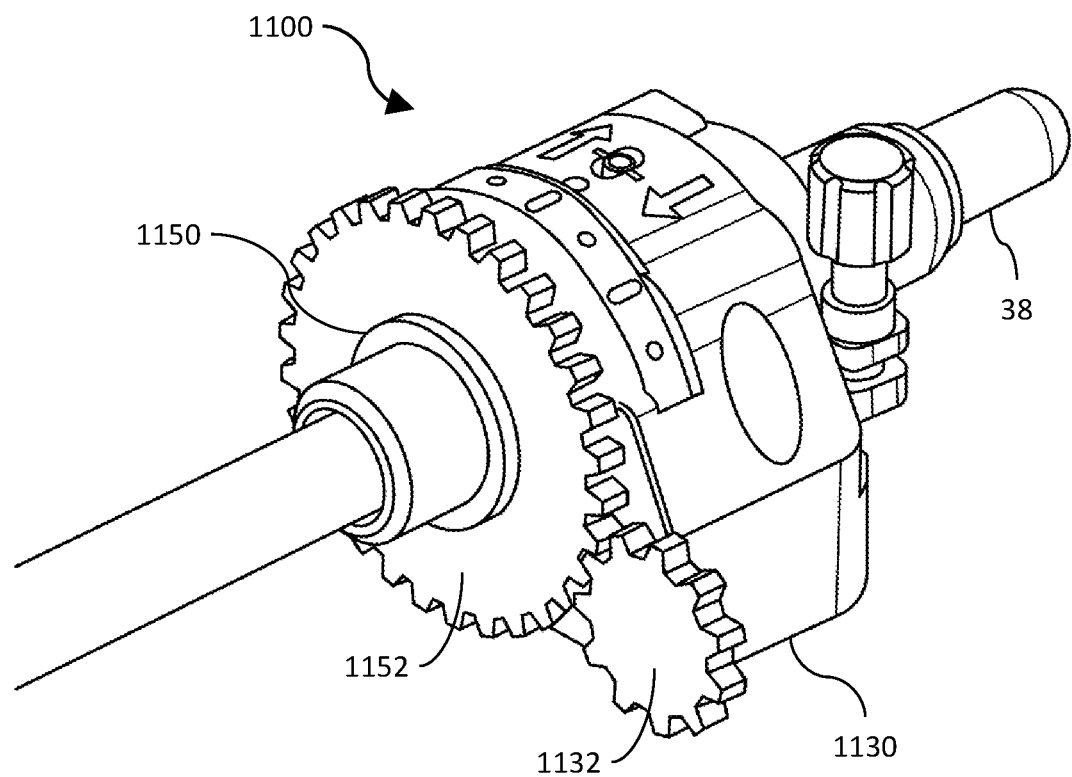
FIG. 11 is a simplified diagram of an embodiment utilizing an exemplary gear arrangement for actuation in accordance with certain aspects of the present disclosure.

FIG. 11 is a simplified diagram of an embodiment utilizing an exemplary gear arrangement for actuation. For example, the adjustable radiation detector support 1100 can include a housing 1130 with a housing gear 1132 (e.g., a pinion) coupled to the housing. A sleeve 1150 can be configured to fit at least partially within the housing 1130, the sleeve 1150 having a sleeve aperture configured to receive and hold the radiation detector 38. The sleeve 1150 can also have a sleeve gear 1152 coupled to the sleeve 1150 and configured to engage the housing gear 1132, where actuation of the housing gear 1132 causes the sleeve gear 1152, and thereby the sleeve 1150, to translate in an axial direction relative to the housing 1130. In some embodiments, the sleeve gear 1152 can be driven by a stepper motor, where the stepper motor rotation translates into the distance the radiation detector 38 travels. Also, while shown in FIG. 11 as including an adjustable nut (similar to other embodiments herein), certain embodiments having such gear arrangements may forego inclusion of the adjustable nut and instead rely on the gear arrangement for actuation of the sleeve.

In the following, further features, characteristics, and exemplary technical solutions of the present disclosure will be described in terms of items that may be optionally claimed in any combination:

Item 1: A system for performing radiation therapy quality assurance, the system comprising: a tank; a drive system configured to move a radiation detector in three dimensions within the tank; and an adjustable radiation detector support configured to be coupled to the drive system, the adjustable radiation detector support having an aperture for receiving a radiation detector, the aperture having an axis and the adjustable radiation detector support further configured to translate the radiation detector in an axial direction relative to the adjustable radiation detector support.

Item 2: The system of Item 1, wherein the tank is cylindrical.

Item 3: The system of any one of the preceding Items, the drive system including a vertical drive, a radial drive, and an angular drive.

Item 4: The system of any one of the preceding Items, the adjustable radiation detector support further comprising: a housing; and a sleeve configured to fit at least partially within the housing, the sleeve having a sleeve aperture configured to receive and hold the radiation detector.

Item 5: The system of any one of the preceding Items, the adjustable radiation detector support further comprising an adjustable nut configured to turn within the housing and including a nut aperture with interior threads configured to mate with exterior threads on the sleeve, wherein the adjustable radiation detector support is configured so that turning the adjustable nut causes the sleeve and the radiation detector to translate in an axial direction relative to the housing.

Item 6: The system of any one of the preceding Items, wherein the exterior threads of the sleeve have a pitch and a length causing the sleeve to be able to translate the sleeve±1.0 mm axially from a center position.

Item 7: The system of any one of the preceding Items, the adjustable radiation detector support further comprising detents configured to provide regulated positioning of the sleeve.

Item 8: The system of any one of the preceding Items, the detents further comprising a spring-loaded plunger coupled to the housing and configured to engage indentations on the adjustable nut to cause the regulated positioning resistance when the spring-loaded plunger aligns with one of the indentations.

Item 9: The system of any one of the preceding Items, wherein the detents are configured to provide the regulated positioning in increments of 0.025 mm of axial travel of the sleeve.

Item 10: The system of any one of the preceding Items, the sleeve comprising: a clamping portion extending around the sleeve aperture and having an axial split; a clamping flange extending from the clamping portion and including a threaded hole and; and a thumbscrew having a threaded section and that is inserted into the threaded hole, where turning the thumbscrew causes the clamping flange to compress the clamping portion.

Item 11: The system of any one of the preceding Items, the sleeve comprising a translation indicator configured to be visible via a translation slot formed in the housing, the translation indicator providing a visual indication of a position of the radiation detector relative to a center position.

Item 12: The system of any one of the preceding Items, further comprising an adapter configured to fit within the sleeve aperture and having a detector aperture configured to receive the radiation detector, and a slot configured to allow the detector aperture to compress around the radiation detector responsive to compression by the sleeve.

Item 13: The system of any one of the preceding Items, wherein the detector aperture is 10 mm in diameter to hold the radiation detector having a 10 mm diameter.

Item 14: The system of any one of the preceding Items, wherein the detector aperture is 6 mm in diameter to hold the radiation detector having a 6 mm diameter.

Item 15: The system of any one of the preceding Items, wherein the detector aperture is rectangular to hold the radiation detector having a rectangular cross section.

Item 16: The system of any one of the preceding Items, the adjustable radiation detector support further comprising a housing and at least one dowel or dowel receptacle in the housing configured to hold the adjustable radiation detector support in place on a trolley configured to be coupled with the drive system.

Item 17: The system of any one of the preceding Items, the adjustable radiation detector support further comprising a magnet configured to facilitate holding the adjustable radiation detector support in place on a trolley.

Item 18: The system of any one of the preceding Items, wherein the magnet has a magnet strength and location such that the magnet does not interfere with operation of the radiation detector.

Item 19: The system of any one of the preceding Items, further comprising a trolley configured to be coupled with the drive system and coupled with the adjustable radiation detector support.

Item 20: The system of any one of the preceding Items, the trolley including a magnet configured to facilitate holding the adjustable radiation detector support in place on the trolley.

Item 21: The system of any one of the preceding Items, wherein the magnet has a magnet strength and location such that the magnet does not interfere with operation of the radiation detector.

Item 22: The system of any one of the preceding Items, the trolley comprising at least one dowel or dowel receptacle configured to hold the adjustable radiation detector support in place on the trolley.

Item 23: The system of any one of the preceding Items, further comprising: a housing; a winding coupled to the housing and configured to generate an axial magnetic field having a strength and direction based on an electrical current in the winding; and a sleeve configured to fit at least partially within the housing, the sleeve comprising: a sleeve aperture configured to receive and hold the radiation detector; and a metallic portion configured to interact with the axial magnetic field; wherein the current causes the sleeve to translate in an axial direction relative to the housing in response to the generated axial magnetic field.

Item 24: The system of any one of the preceding Items, further comprising a voice coil connected to the adjustable radiation detector support and configured to receive a current and/or voltage that provides actuation of the radiation detector.

Item 25: The system of any one of the preceding Items, further comprising: a housing; a housing gear coupled to the housing; a sleeve configured to fit at least partially within the housing, the sleeve having a sleeve aperture configured to receive and hold the radiation detector; and a sleeve gear coupled to the sleeve and configured to engage the housing gear; wherein actuation of the housing gear causes the sleeve gear, and thereby the sleeve, to translate in an axial direction relative to the housing.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (or "computer readable medium") refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" (or "computer readable signal") refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, computer programs and/or articles depending on the desired configuration. Any methods or the logic flows depicted in the accompanying figures and/or described herein do not necessarily require the particular order shown, or sequential order, to achieve desirable results. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. The implementations described above can be directed to various combinations and subcombinations of the disclosed features and/or combinations and subcombinations of further features noted above. Furthermore, above described advantages are not intended to limit the application of any issued claims to processes and structures accomplishing any or all of the advantages.

Additionally, section headings shall not limit or characterize the invention(s) set out in any claims that may issue from this disclosure. Further, the description of a technology in the "Background" is not to be construed as an admission that technology is prior art to any invention(s) in this disclosure. Neither is the "Summary" to be considered as a characterization of the invention(s) set forth in issued claims. Furthermore, any reference to this disclosure in general or use of the word "invention" in the singular is not intended to imply any limitation on the scope of the claims set forth below. Multiple inventions may be set forth according to the limitations of the multiple claims issuing from this disclosure, and such claims accordingly define the invention(s), and their equivalents, that are protected thereby.

What is claimed is:

1. A system for performing radiation therapy quality assurance, the system comprising:
   a tank;
   a drive system configured to move a radiation detector in three dimensions within the tank; and
   an adjustable radiation detector support configured to be coupled to the drive system, the adjustable radiation detector support having an aperture for receiving a radiation detector, the aperture having an axis and the adjustable radiation detector support further configured to translate the radiation detector in an axial direction relative to the adjustable radiation detector support.

2. The system of claim 1, wherein the tank is cylindrical.

3. The system of claim 1, the drive system including a vertical drive, a radial drive, and an angular drive.

4. The system of claim 1, the adjustable radiation detector support further comprising:
   a housing; and
   a sleeve configured to fit at least partially within the housing, the sleeve having a sleeve aperture configured to receive and hold the radiation detector.

5. The system of claim 4, the adjustable radiation detector support further comprising an adjustable nut configured to turn within the housing and including a nut aperture with interior threads configured to mate with exterior threads on the sleeve, wherein the adjustable radiation detector support is configured so that turning the adjustable nut causes the sleeve and the radiation detector to translate in an axial direction relative to the housing.

6. The system of claim 5, wherein the exterior threads of the sleeve have a pitch and a length causing the sleeve to be able to translate the sleeve±1.0 mm axially from a center position.

7. The system of claim 5, the adjustable radiation detector support further comprising detents configured to provide regulated positioning of the sleeve.

8. The system of claim 7, the detents further comprising a spring-loaded plunger coupled to the housing and configured to engage indentations on the adjustable nut to cause regulated positioning resistance when the spring-loaded plunger aligns with one of the indentations.

9. The system of claim 7, wherein the detents are configured to provide the regulated positioning in increments of 0.025 mm of axial travel of the sleeve.

10. The system of claim 4, the sleeve comprising:
    a clamping portion extending around the sleeve aperture and having an axial split;
    a clamping flange extending from the clamping portion and including a threaded hole; and
    a thumbscrew having a threaded section and that is inserted into the threaded hole, where turning the thumbscrew causes the clamping flange to compress the clamping portion.

11. The system of claim 4, the sleeve comprising a translation indicator configured to be visible via a translation slot formed in the housing, the translation indicator providing a visual indication of a position of the radiation detector relative to a center position.

12. The system of claim 4, further comprising an adapter configured to fit within the sleeve aperture and having a detector aperture configured to receive the radiation detector, and a slot configured to allow the detector aperture to compress around the radiation detector responsive to compression by the sleeve.

13. The system of claim 12, wherein the detector aperture is 10 mm in diameter to hold the radiation detector having a 10 mm diameter.

14. The system of claim 12, wherein the detector aperture is 6 mm in diameter to hold the radiation detector having a 6 mm diameter.

15. The system of claim 12, wherein the detector aperture is rectangular to hold the radiation detector having a rectangular cross section.

16. The system of claim 1, the adjustable radiation detector support further comprising a housing and at least one dowel or dowel receptacle in the housing configured to hold the adjustable radiation detector support in place on a trolley configured to be coupled with the drive system.

17. The system of claim 1, the adjustable radiation detector support further comprising a magnet configured to facilitate holding the adjustable radiation detector support in place on a trolley.

18. The system of claim 17, wherein the magnet has a magnet strength and location such that the magnet does not interfere with operation of the radiation detector.

19. The system of claim 1, further comprising a trolley configured to be coupled with the drive system and coupled with the adjustable radiation detector support.

20. The system of claim 19, the trolley including a magnet configured to facilitate holding the adjustable radiation detector support in place on the trolley.

21. The system of claim 20, wherein the magnet has a magnet strength and location such that the magnet does not interfere with operation of the radiation detector.

22. The system of claim 19, the trolley comprising at least one dowel or dowel receptacle configured to hold the adjustable radiation detector support in place on the trolley.

23. The system of claim 1, further comprising:
    a housing;
    a winding coupled to the housing and configured to generate an axial magnetic field having a strength and direction based on an electrical current in the winding; and
    a sleeve configured to fit at least partially within the housing, the sleeve comprising:
       a sleeve aperture configured to receive and hold the radiation detector; and
       a metallic portion configured to interact with the axial magnetic field;
    wherein the electrical current causes the sleeve to translate in an axial direction relative to the housing in response to the axial magnetic field.

24. The system of claim 1, further comprising a voice coil connected to the adjustable radiation detector support and configured to receive a current and/or voltage that provides actuation of the radiation detector.

25. The system of claim 1, further comprising:
    a housing;
    a housing gear coupled to the housing;
    a sleeve configured to fit at least partially within the housing, the sleeve having a sleeve aperture configured to receive and hold the radiation detector; and a sleeve gear coupled to the sleeve and configured to engage the housing gear; wherein actuation of the housing gear causes the sleeve gear, and thereby the sleeve, to translate in an axial direction relative to the housing.

* * * * *